United States Patent [19]

Brunner et al.

[11] Patent Number: 4,987,602
[45] Date of Patent: Jan. 22, 1991

[54] METHOD OF DISPLAYING HIGH-RESOLUTION DISTRIBUTIONS OF PHYSICAL PARAMETERS ON A MONITOR AND DEVICE FOR CARRYING OUT THE METHOD

[76] Inventors: Wolfgang Brunner, Ringenberg 175, 8999 Maierhöfen, Fed. Rep. of Germany; Ludwig V. Zech, Argensee, 7964 Kisslegg, Fed. Rep. of Germany

[21] Appl. No.: 345,040

[22] Filed: Apr. 28, 1989

[30] Foreign Application Priority Data

May 31, 1988 [DE] Fed. Rep. of Germany ....... 3818534

[51] Int. Cl.$^5$ .............................................. G06K 9/00
[52] U.S. Cl. ........................................ 382/1; 364/521; 340/731; 340/799

[58] Field of Search ................. 382/54, 22, 1; 358/13, 358/109; 340/799, 734; 364/518, 521, 522

[56] References Cited

U.S. PATENT DOCUMENTS

| | | | |
|---|---|---|---|
| 4,631,691 | 12/1986 | Pica ..................................... | 364/521 |
| 4,749,990 | 6/1988 | Birkner ................................ | 340/799 |
| 4,785,296 | 11/1988 | Tabata et al. ...................... | 340/731 |

Primary Examiner—Leo H. Boudreau
Assistant Examiner—Tan Dinh
Attorney, Agent, or Firm—Max Fogiel

[57] ABSTRACT

A method of displaying a high-resolution distribution of the amount of physical parameters measured on a prescribed surface by a number of sensors with an electric output signal, especially pressures or forces acting at right angles on a stage that has a matrix of sensors, on a display.

16 Claims, 3 Drawing Sheets

METHOD OF DISPLAYING HIGH-RESOLUTION DISTRIBUTIONS OF PHYSICAL PARAMETERS ON A MONITOR AND DEVICE FOR CARRYING OUT THE METHOD

The invention concerns both a method of displaying high-resolution distributions of physical parameters, pressures or forces for example, on a monitor and a device for carrying out the method.

The images that can be attained in previous methods of displaying such results usually do not resemble the actual physical situation, especially if the data are in small increments, as they are in the distributions of pressure and temperature characteristic of medical science for example.

The object of the invention is accordingly to improve the generic method and device to the extent that the displays will be more satisfactory.

The object is attained in accordance with the invention in that the values of the pixel matrix that is to be displayed are obtained from a matrix of results by weighting their ambient points, whereby the pixel memory must always be constructed row by row or column by column.

Practical embodiments and refinements of the invention are recited in the subsidiary claims.

Figure 1:
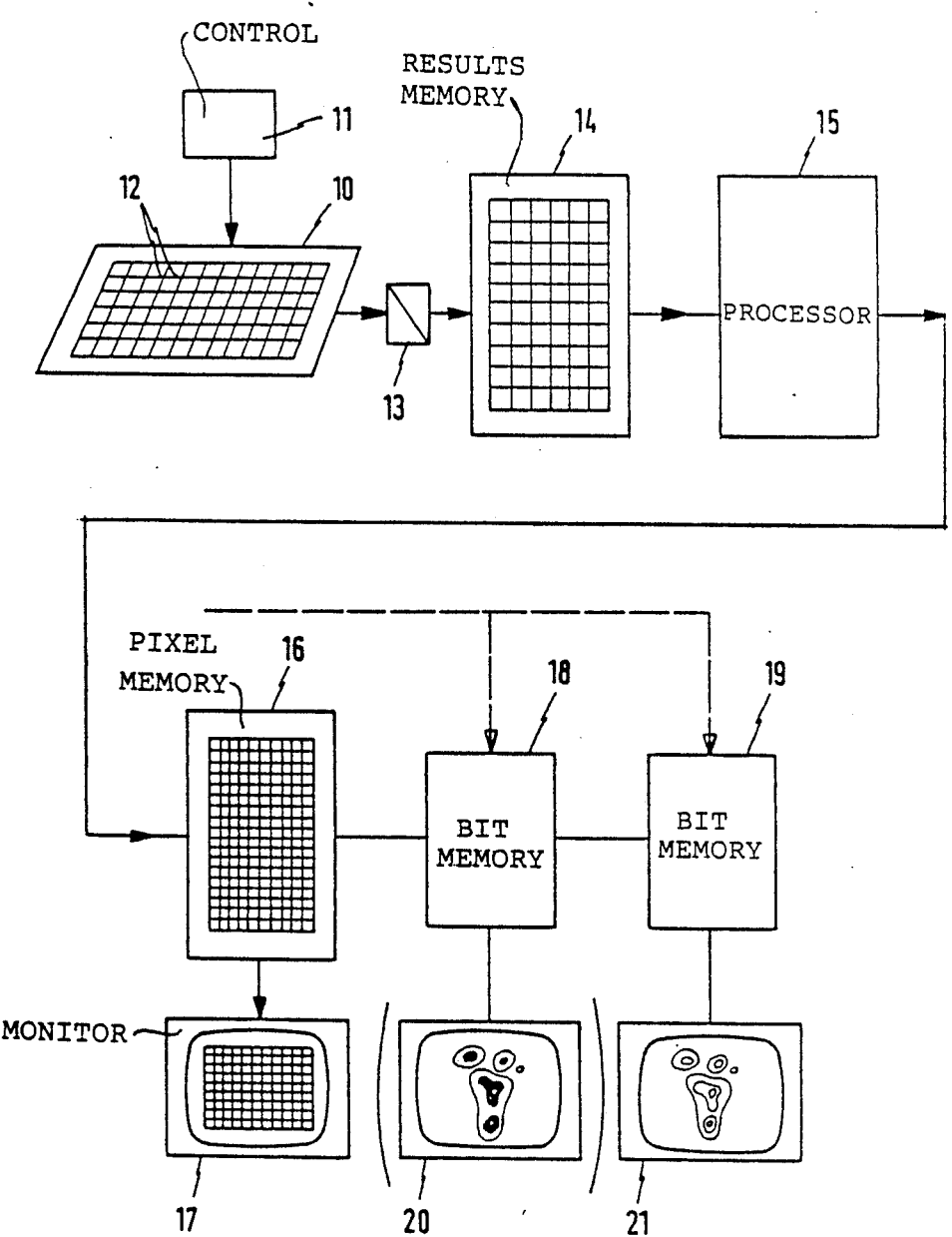
Figure 2A:
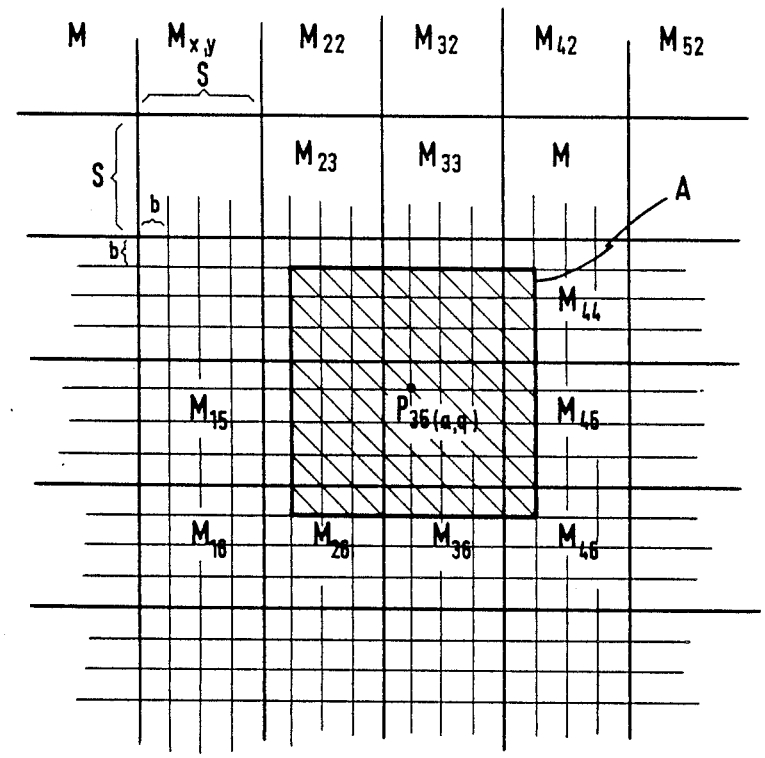
Figure 2B:
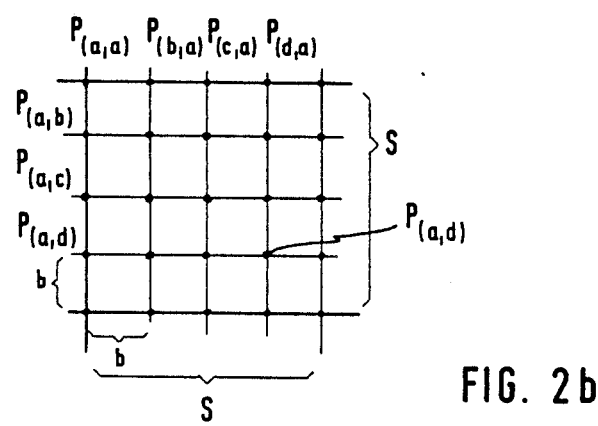
Figure 3:
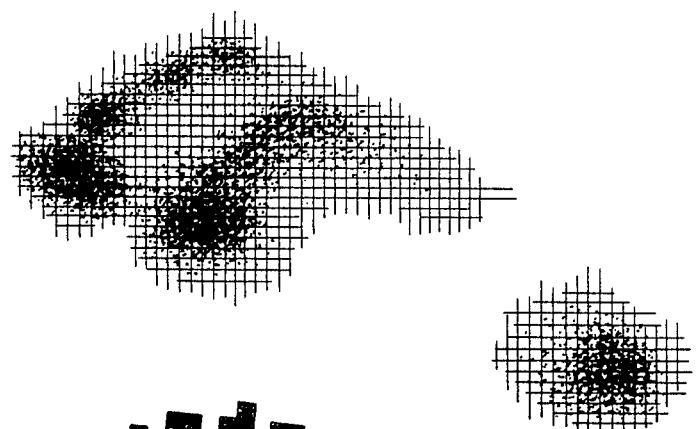
Figure 4:
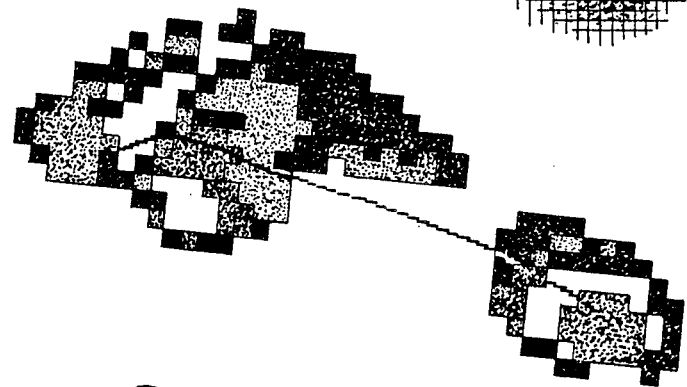
Figure 5:
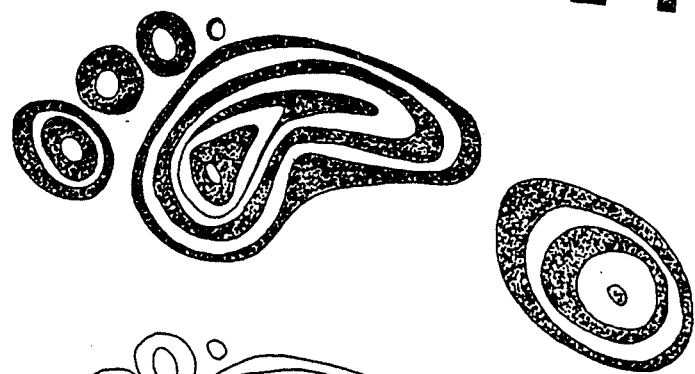
Figure 6:
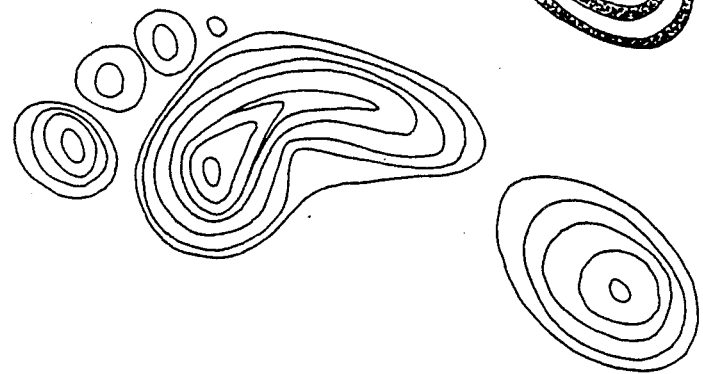

A preferred embodiment of the invention will now be described in detail with reference to the drawing, wherein FIG. 1 is a schematic representation of a device for carrying out the method, FIGS. 2A and 2B illustrates the relationship between the results matrix and the pixel matrix, FIG. 3 illustrates a display of a pixel matrix in shades of gray, FIG. 4 illustrates a conventional result-matrix display, FIG. 5 illustrates a display employing isozones, and FIG. 6 illustrates a display employing isograms.

The device for carrying out the method of obtaining measurements has a stage 10 and controls 11 that control individual sensors 12 individually. The results from each sensor are entered in a results memory 14 by way of an analog-to-digital converter 13. The memory is in the form of a matrix with each address associated with one sensor. The digital result emitted by each sensor is stored in its associated address in the memory. Also associated with results memory 14 is a processor 15 that computes pixels from the results and stores them in a pixel memory 16 that is also in the form of a matrix. A monitor 17 displays the contents of pixel memory 16.

One bit memory 18 stores isozones (regions of equal value) and another bit memory 19 stores isograms (curves of equal value). Processor 15 computes vales from the pixel matrix and stores them in the bit memories, whence they can be displayed on monitor 17 or on additional monitors 20 and 21.

FIG. 2 illustrates how a virtual image M in the form of a matrix of squares with sides of length s representing the position of each sensor 12 can be generated from the digital values stored in results memory 14 and how another virtual image in the form of a matrix of squares with sides of length $b = s/2^n$ can be generated from the pixels, with one virtual image superimposed on the other. Processor 15 constructs each pixel out of the square area A that centrally surrounds it in the other virtual image. The construction process consists of taking each digital value contained and stored in surrounding region A in first virtual image M and weighting it with the surrounded component area. This is done by multiplying the two factors, adding all the products together, dividing the sum by the sum of all the component areas (of surrounding region A that is) and storing the quotient at the appropriate address in pixel memory 16.

Thus matrix M consists of squares with sides of length s, and each square contains the digital results of the measurements obtained by the individual sensors 12 in stage 10. Matrix M constitutes a preliminary virtual image. The first digit of the subscript associated with each square represents the column and the second digit the row.

Associated with each square with a side s in the results matrix M illustrated in FIG. 2b is a pixel matrix P with 16 pixels. Each pixel is separated from its neighbors by a distance b such that $4b = s$. Thus, as illustrated in FIG. 2a, the pixel point $P_{35}^2{}_{(aa)}$ of pixel matrix P (second and superimposed virtual image) is calculated on the matrix location $MP_{35}$ of results matrix M (first virtual image) as $$P_{35(aa)} = (16M_{24} + 16M_{34} + 16M_{25} + 16M_{35}) \tag{1}$$

$$P_{35(bb)} = (9M_{24} + 12M_{34} + 3M_{44} + 12M_{25} + 16M_{35} + 4M_{45})16 \tag{2}$$

whereby for simplicity's sake it is also possible to employ the recursive definition $$K_1 = 3M_{26} + 4M_{36} + M_{46} \tag{3}$$
$$K_2 = 3M_{24} + 4M_{34} + M_{44} \tag{4}$$
$$P_{35(bb)} = P_{35(bb)} \tag{5}$$

This pixel matrix can be displayed on monitor 17 (FIG. 1). If it is stored in shades of gray, the, monitor can display an image like that illustrated in FIG. 3. FIG. 4 shows a low-resolution image as displayed directly from the results matrix without further processing.

FIG. 5 illustrates a bit matrix obtained by logical processing of the values stored in pixel memory 16, stored in bit memory 18, and displayed on monitor 20. It represents isozones (regions of equal pixel value). Isograms can also be obtained by further processing from second bit memory 19.

We claim:

1. A method for displaying a high-resolution distribution of physical parameters in form of pressures or forces acting at right angles on a stage having a matrix of sensors, comprising the steps: measuring said parameters with said sensors having an electrical output signal, said parameters being displayed on a display monitor; converting said output signal to digital values when said output signal is an analog signal; storing digital values of each sensor in a respective address in a results memory; generating from the digital values stored in the results memory a first virtual image in form of a matrix of squares with sides of a first predetermined length and representing locations of said sensors, each stored digital value being associated with pixel values from a pixel memory; generating from the pixel values a second virtual image in form of a matrix of squares with sides of a second predetermined length differing from said first predetermined length, one virtual image being superimposed on the other virtual image; calculating each pixel value by a processor from a square area surrounding centrally said pixel value in said second virtual image by determining each area in said first virtual image; weighting each area with stored digital value in said first virtual image by forming products with areas of surrounding squares and summing all products; summing all areas of said surrounding squares; dividing the sum of all products by the sum of all areas of said surrounding squares and forming a quotient; storing the quotient in a corresponding address in said pixel memory; and displaying contents of said pixel memory on said display monitor.

2. A method as defined in claim 1, wherein said sensors are arranged in an array of mutually perpendicular rows and columns, adjacent sensors being all equally spaced from each other.

3. A method as defined in claim 1, wherein said digital values are entered serially in said results memory.

4. A method as defined in claim 1, wherein said results memory has addresses equal in number to said sensors.

5. A method as defined in claim 4, wherein said addresses in said results memory are in form of a matrix of rows and columns, each sensor in said stage having a digital value associated with each address.

6. A method as defined in claim 1, wherein said square area surrounding centrally said pixel value in said second virtual image is equal to four times said second predetermined length.

7. A method as defined in claim 1, wherein said pixel memory has addresses arrayed in a matrix of rows and columns, pixel values in one row or column being calculated sequentially and then row by row or column by column.

8. A method as defined in claim 1, wherein each pixel value is stored in said pixel memory in form of a byte representing shades of gray and including individual bits.

9. A method as defined in claim 8, wherein each byte corresponding to a pixel is read out; and storing a predetermined bit at a predetermined position in said byte at a corresponding address associated with a respective pixel in a bit memory.

10. A method as defined in claim 9, including the step of displaying contents of said bit memory in form of areas of equal value.

11. A method as defined in claim 9, wherein said bit memory has a content stored one position ahead in a row and with same columns in another bit memory, each byte corresponding to a pixel being read out, said another bit memory being a second bit memory and said first-mentioned bit memory being a first bit memory; advancing a bit designated at a particular position by the byte by one position in the column and storing in same rows in a fourth bit memory, corresponding addresses in said second and fourth bit memory being logically connected to provide an exclusive OR; storing results in a third bit memory, said second bit memory having a content stored one position ahead in the column and with same rows in said fourth bit memory; storing results in a fifth bit memory, corresponding addresses in said third and fifth bit memories being logically connected to provide an exclusive OR; and storing results in a sixth bit memory.

12. A method as defined in claim 11, wherein said sixth bit memory has a content displayed in form of lines of equal value corresponding to isograms.

13. Apparatus for displaying a high-resolution distribution of physical parameters in form of pressures or forces acting at right angles on a stage having a matrix of sensors, comprising: a matrix of sensors on a stage; said sensors measuring said parameters and having an electrical output signal; a displaying monitor for displaying said parameters; means for converting said output signal to digital values when said output signal in an analog signal; a results memory for storing digital values of each sensor in a respective address in said results memory; means for generating from digital values stored in said results memory a first virtual image in form of a matrix of squares with sides of a first predetermined length and representing locations of said sensors; a pixel memory, each stored digital value being associated with pixel values from said pixel memory; means for generating from said pixel values a second virtual image in form of a matrix of squares with sides of a second predetermined length differing from said first predetermined length, one virtual image being superimposed on the other virtual image; a processor for calculating each pixel value from a square area surrounding centrally said pixel value in said second virtual image by determining each area in said first virtual image; means for weighting each area with stored digital value in said first virtual image by forming products with areas of surrounding squares and summing all products; means for summing all areas of said surrounding squares; means for dividing the sum of all products by the sum of all areas of said surrounding squares and forming a quotient; means for storing said quotient in a corresponding address in said pixel memory, contents of said pixel memory being displayed on said display monitor.

14. Apparatus as defined in claim 13, including controls for controlling said sensors; said converting means comprising an analog-to- digital converter.

15. Apparatus as defined in claim 13, including at least one bit memory for storing isozones corresponding to areas of equal value; and an additional monitor for display of said isozones.

16. Apparatus as defined in claim 13, including at least one bit-memory for storing isograms; and an additional monitor for displaying said isograms.

* * * * *